United States Patent [19]
Miesner

[11] Patent Number: 5,878,997
[45] Date of Patent: Mar. 9, 1999

[54] COMPACT LOW-INDUCTANCE MAGNETORHEOLOGICAL DAMPER

[75] Inventor: John E. Miesner, Fairfax, Va.

[73] Assignee: Lucent Technologies Inc., Murray Hill, N.J.

[21] Appl. No.: 926,841

[22] Filed: Sep. 10, 1997

[51] Int. Cl.[6] ........................................... F16F 5/00
[52] U.S. Cl. .................. 267/140.14; 188/267.1; 188/322.22; 267/64.26
[58] Field of Search ............... 188/267.1, 267.2, 188/322.15, 322.22, 289; 267/140.13–140.15, 64.11, 64.15, 64.26, 64.28

[56] References Cited

U.S. PATENT DOCUMENTS

| | | | |
|---|---|---|---|
| 3,693,768 | 9/1972 | Erdwau | 188/289 |
| 4,452,437 | 6/1984 | Lochner | 188/289 |
| 4,759,534 | 7/1988 | Hautel | 188/268 |
| 4,802,657 | 2/1989 | Wijuhoven et al. | 267/64.24 |
| 4,852,863 | 8/1989 | Breitenbachen et al. | 267/218 |
| 4,858,898 | 8/1989 | Niikuva et al. | 267/218 |
| 4,946,131 | 8/1990 | Weyard | 188/268 |
| 5,018,606 | 5/1991 | Carlson | 188/267.1 |
| 5,176,368 | 1/1993 | Shtaukman | 267/140.14 |
| 5,398,917 | 3/1995 | Carlson et al. | 267/140.14 |
| 5,573,088 | 11/1996 | Daniels | 188/267 |

FOREIGN PATENT DOCUMENTS

| | | | |
|---|---|---|---|
| 0166151 | 10/1983 | Japan | 188/267.2 |
| 6193671 | 7/1994 | Japan | 267/140.14 |

*Primary Examiner*—Chris Schwartz

[57] ABSTRACT

According to one aspect of the invention, a magnetorheological fluid (MRF) damping device includes two concentric coils or groups of coils arranged to produce respective magnetic fields that mutually cancel substantially everywhere but within the gap between them. The rheological properties of the MRF are magnetically controlled within this gap. According to a second aspect of the invention, the piston rod of a MRF damper or other viscous fluid damper communicates its motion to a hollow, capped cylinder. Damping fluid within this cylinder communicates via a narrow channel with damping fluid outside of this cylinder. When the piston rod undergoes motions directed so as to expel fluid from the interior of the cylinder, resistance within the narrow channel causes pressure to build up within the cylinder, but prevents any substantial amount of pressure from building up without the cylinder, thus isolating sealing devices from the highest resistive forces generated within the damping fluid. According to a third aspect of the invention, a piston head for a viscous fluid damper is arranged to pass small-amplitude displacements with reduced damping. A floating piston is disposed in a borehole that passes through the piston head. This borehole provides a low-resistance pathway for fluid flow when piston displacements are relatively small, but the floating piston closes this pathway when piston displacements are relatively large.

24 Claims, 4 Drawing Sheets

COMPACT LOW-INDUCTANCE MAGNETORHEOLOGICAL DAMPER

GOVERNMENT CONTRACT

This invention was made with Government support under Contract N00014-96-C-2079. The Government has certain rights in this invention.

FIELD OF THE INVENTION

This invention relates to magnetorheological devices. More particularly, this invention relates to devices in which the flow properties of a fluid are controlled by a magnetic field in such a way as to provide desired damping of a piston rod or other force-transmitting or torque-transmitting member.

BACKGROUND OF THE INVENTION

A magnetorheological fluid (MRF) is a fluid that responds to a magnetic field by changing its rheological behavior. Typically, such a fluid will reversibly change from a free-flowing, linear viscous liquid to a semi-solid when exposed to a magnetic field of sufficient strength. In practice, the time interval over which this change takes place is often limited by the characteristics of the field coil that produces the applied magnetic field, and of the circuitry that drives the field coil. Typical MRFs are particulate suspensions of iron or magnetic alloy in a carrier liquid which may, e.g., be petroleum-based, or water- or glycol-based.

The yield strength of a MRF is magnetically controllable. This property can be utilized in devices that include a magnetic field source, and that contain a MRF. The MRF can be made selectively resistant to flow or shear in portions of the device that are subjected to the magnetic field.

Such devices have been described. For example, U.S. Pat. No. 5,277,281, which issued on Jan. 11, 1994 to J. D. Carlson et al., discloses a fluid damper that utilizes the properties of a MRF. Briefly, a piston moves up and down within a MRF-filled chamber. The piston effectively divides the chamber into upper and lower portions interconnected by a narrow annular channel between the piston and the inner wall of the chamber. When the piston is displaced, MRF is required to flow through this channel. A field coil is included within the piston. When the field coil is energized, a magnetic field permeates the channel and excites a transformation of the MRF to a state that exhibits substantial damping forces.

Devices of this kind have proven to be quite useful. However, they suffer from certain limitations that tend to restrict their range of applications. For example, there is a need for MRF devices that can be switched more rapidly than those that are generally available at present. However, for a given flux density required to control the MRF, the response time of the device tends to go up as the amount of energy stored in the magnetic field is increased. Generally, this quantity tends to increase when steel (or other ferrous metal) components are made part of the magnetic circuit; i.e., when such components are traversed by the magnetic field lines that act upon the MRF. In conventional MRF devices, the magnetic field lines generally traverse a substantial volume of steel. As a consequence, the degree to which the response time of these devices can be shortened is limited.

Furthermore, there is a need for a compact, powerful MRF device such as one that can generate dynamic forces on the order of 50 tons within a package having a maximum dimension on the order of 10 inches or less. Such a device can be achieved only by increasing the magnetic flux density, within the MRF, beyond the levels that are typically encountered in conventional MRF devices. A compact, powerful MRF device will be especially useful if it can be switched between the damping and non-damping states within a relatively short time interval, such as an interval of a few milliseconds or less.

However, there inheres in conventional MRF devices a conflict between the goal of increasing magnetic flux density, and the goal of preserving short response times. As noted, the response time tends to go up as the amount of energy stored in the magnetic field is increased, particularly when there is steel (or other saturable materials) in the magnetic circuit. This effect may become greatly magnified at high values of the flux density. Under such conditions, the required field strength from the coil may be sufficient to cause magnetic saturation of the steel components. As saturation is approached, there is a steep increase in the field strength needed to produce a given flux density and therefore a steep increase in the stored energy. The previous referenced U.S. Pat. No. 5,277,281, discusses the design limitations to which conventional MRF devices are subject.

Another limitation of conventional MRF devices relates to the seal between the high-pressure side of the device and the environment (which is typically the atmosphere). Such a seal is typically a sliding seal that admits, or a deformable seal that seals around, a moveable piston rod. The resistance of the MRF to motions of the piston rod generates high pressures within the device. Unusually high pressures, such as may be caused by unexpectedly severe shock loads, may result in seal failure.

Thus, there has remained a need for MRF devices that can be operated with higher magnetic flux densities, while remaining limited in spatial dimensions and preserving short response times. There has also remained a need for MRF devices that are capable of withstanding exceptionally high resistive forces.

SUMMARY OF THE INVENTION

I have invented an improved MRF damper in which the magnetic flux intensity is substantially confined to the MRF; and substantially excluded from steel components. As a consequence, rapid response times are readily achieved, even at relatively high values of the flux intensity.

This is achieved, in accordance with one aspect of the invention, by employing two concentric coils or groups of coils referred to, respectively, as inner and outer coils. During displacements of a shaft such as a piston rod, or of some other moveable mechanical element, MRF is forced to flow through a narrow channel between one or more inner coils and one or more outer coils, or it is sheared by the motion of the components holding these coils. An electric current flowing in the outer coil generates a magnetic field within the narrow channel. An electric current in the opposite sense flows in the inner coil. The fields generated by the respective coils substantially cancel each other everywhere except within the narrow channel.

In a second aspect, the invention involves an arrangement for a MRF damper or other viscous fluid damper, in which one or more seals are isolated from the highest resistive forces generated within the damping fluid. In such an arrangement, the piston rod communicates its motion to a hollow, capped cylinder. A portion of the damping fluid lies within this cylinder, and a portion of the damping fluid lies without. The respective fluid portions intercommunicate via the narrow channel. When the piston rod undergoes motions directed so as to expel fluid from the interior of the cylinder, resistance within the narrow channel causes pressure to build up within the cylinder, but prevents any substantial amount of pressure from building up without the cylinder. If the damping fluid is a MRF, magnetic control of its rheological properties can be provided by one or more current-carrying coils or, in alternate embodiments, by an arrangement of one or more permanent magnets.

In a third aspect, the invention involves a piston head for a viscous fluid damper that passes small-amplitude displacements with reduced damping, or even with no substantial damping at all. The piston head is configured in such a way that when it is displaced through relatively large distances, damping fluid is constrained to flow through one or more relatively flow-resistive pathways, such as a narrow channel from one side of the piston head to the other. However, defined within the piston head is an orifice that extends from one side to the other. Suspended within the orifice is a floating piston. When the volume of fluid displaced by the piston head is smaller than the allowed stroke of the floating piston times its area, damping fluid is not substantially constrained to flow through, e.g., the narrow channel. As a consequence, the viscous damping forces are substantially reduced.

DETAILED DESCRIPTION OF AN ILLUSTRATIVE EMBODIMENT

Figure 1:
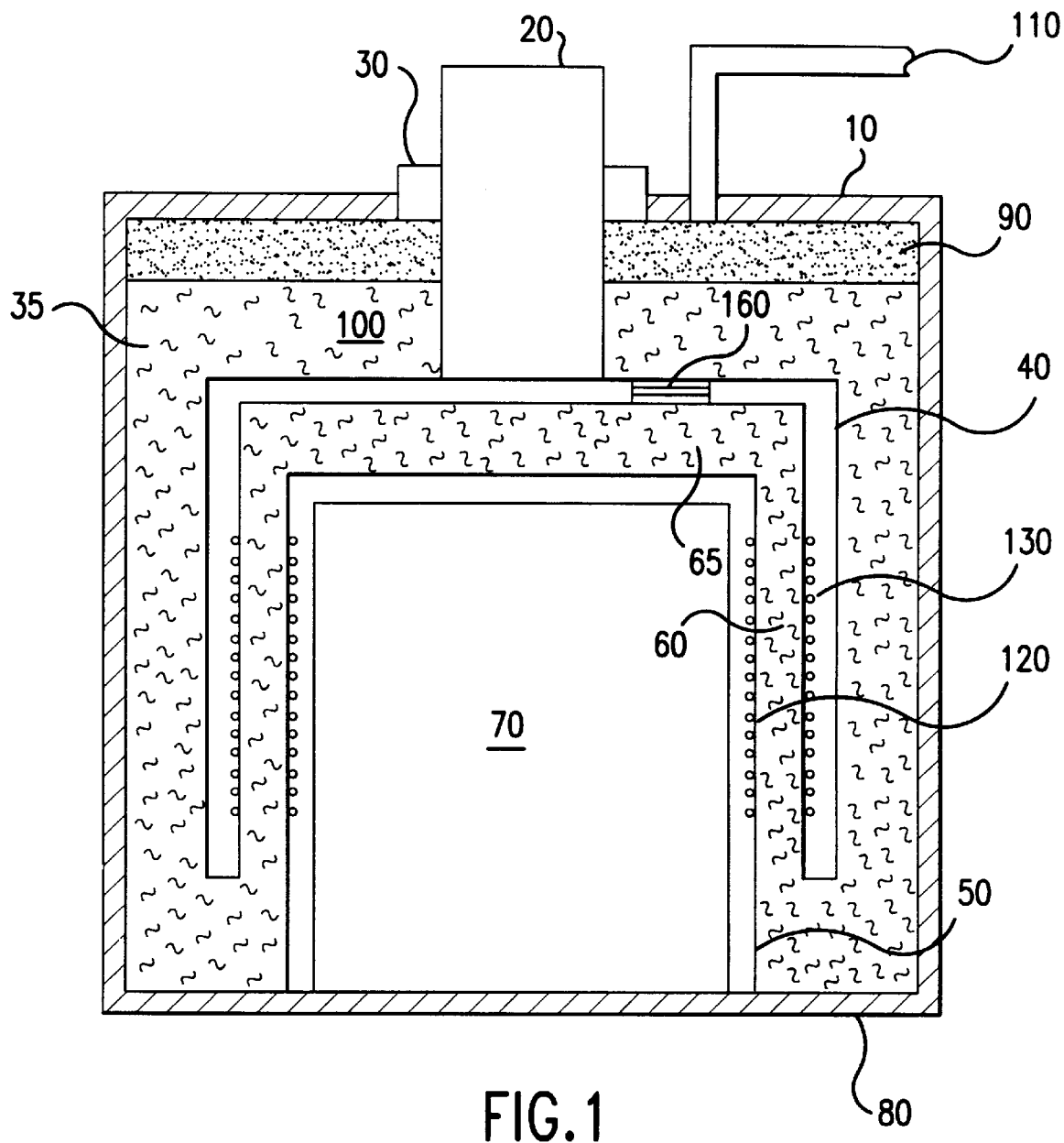
FIG. 1 is a schematic, cross-sectional view of a magnetorheological damper, according to the invention in one embodiment.

The illustrative embodiment depicted in FIG. 1 includes an outer casing 10. This casing is exemplarily formed as a closed-ended cylinder of 0.5-inch steel, 10 inches in outer diameter and 10 inches in height. The dimensions are not critical, provided only that sufficient stroke is provided for piston rod 20, and that the casing can withstand the forces that it may encounter in use, as discussed below. Similarly, any material of sufficient strength may be used, although steel is conveniently used for all of the metal parts of the illustrative device (except for the field coils). Because very little magnetic flux will be present in the metal parts, as discussed below, the magnetic properties of the case, or of any other metal part, will also not generally be critical.

Seal 30 is provided to permit motion of piston rod 20 directed in and out relative to region 35 enclosed by case 10. Seal 30 must be able to withstand the forces encountered within the case during use, but otherwise may be selected from any of various conventional seals known to those skilled in the art. In particular, sliding seals will be useful in this regard, because they permit the greatest stroke of the piston. If the piston is to have more limited stroke, it may be desirable in some cases to use a non-sliding, deformable seal.

In alternate embodiments of the invention, piston rod 20 is replaced by a rotatable shaft that undergoes rotation or torsional motion. In such a case, of course, an appropriate seal would be one that permits such rotational or torsional motion.

As shown in the figure, the inward-facing (relative to case 10) end of piston rod 20 terminates in a piston head (or shaft head) herein denoted socket 40. Socket 40, like case 10, is exemplarily made from 0.5-inch steel. Socket 40 is concave downward, in the view shown in the figure. Socket 40 is conformed to surround a projection, herein denoted plug 50, such that a narrow annular gap 60, typically 2–4 mm wide, is defined in the radial direction between the socket and the plug. Typically, socket 40 will be formed as a right circular cylinder having one closed end adjacent the inward end of piston rod 20. The diameter of socket 40 is not critical and will be determined, in practice, by the desired total size of the annular gap (where the switchable properties of the MRF are exploited), and by the loading forces that the socket is expected to encounter in use. The height of the socket should be at least equal to the length of piston stroke that is to be controlled, and preferably somewhat more in order to accommodate a sufficient length of field coils, as discussed below.

In FIG. 1, the socket is depicted as a single element concentric with the piston rod 20. This configuration will be useful not only in connection with a reciprocally moving piston rod 20, but also in connection with a rotatable shaft. In the case of a piston, however, alternate configurations may also be useful. These include those in which the socket and plug are offset from the piston. For balancing of loads, it will generally be desirable in such cases to employ two or more, symmetrically placed, offset sockets, each mating with a respective offset plug.

Moreover, it should be noted that it is not critical for the socket and plug to be cylindrical in shape (except in the case of a rotatable shaft), although this shape affords the most efficient use of space and therefore is generally preferable.

In use, inward displacements of the piston rod 20 will tend to expel MRF from head space 65, and outward displacements will tend to draw MRF into that space. By head space 65 is meant the space between the socket and the plug that grows smaller as the piston rod 20 is inserted further into region 35. In both cases, MRF will be caused to flow through gap 60. Magnetic switching of the MRF, within gap 60, will lead to damping forces that oppose these displacements of the piston rod. In the case of a rotatable piston rod 20, torsional motions thereof will tend to shear the MRF within gap 60. Again, magnetic switching of the MRF will lead to damping forces that oppose these torsional motions.

When the damping forces are opposing the inward motion of piston rod 20, pressure will build up within head space 65. However, socket 40 and gap 60 will substantially isolate the neighborhood of seal 30 from the overpressure within the head space. As a consequence, a pressure gradient will build up within gap 60. .P As noted, plug 50 is conformed to fit within socket 40 so as to leave gap 60 between them. Plug 50 is exemplarily made from 0.5-inch steel. Interior region 70 of the plug can be made hollow, and can be made accessible through one or more openings in end 80 of the case. In at least some cases, it will be convenient to situate electrical circuitry within region 70 for storing electrical energy or for conditioning electrical energy to be applied to the field coils.

In many cases, it will be advantageous to maintain a pressurized air (or other gas) layer 90 above the fluid level of MRF 100. As piston rod 20 is driven in or out of enclosed region 35, the total volume of the piston rod that lies within the enclosed region increases and decreases, and concomitantly, the volume of MRF displaced by the piston rod 20 increases and decreases. The air layer provides a compressible fluid that can accommodate these displacement variations without void formation or subjection to extreme pressures.

A further advantage of the air layer is that it provides an elastic restoring force that is inherently integrated with the MRF device to provide a combination of elastic and viscous response. The coefficient of the restoring force (which is properly a "spring constant" only for a small range of piston displacements) is fixed by the volume of gas included in volume 90 and is proportional to the area of piston rod 20. The integrated device provides static support of weight applied to piston rod 20. The weight supported is equal to the area of piston rod 20 times the pressure of air volume 90. Pressurization may conveniently be controlled through gas inlet 110. This gas inlet may further be used to adjust of height of the piston rod 20 and any supported weight to keep it within a desired range. An automatic level control system can provide this function and thereby compensate for any changes in load on piston rod 20 which would tend to move the damper system outside of the desired operating range. Use of gas inlet 110 in this manner allows the designed "spring constant" to be very low for, e.g., decoupling from acoustic disturbances.

Yet another advantage of the air layer is that it permits the use of an air seal that is not constantly subjected to erosion by particulate matter suspended in the MRF.

If the damper is to be operative on both inward and outward strokes of the piston rod, it will generally be desirable to pressurize enclosed region 35. Such pressurization is desirable to prevent the backstroke (i.e., the outward stroke of the piston rod) from drawing a partial vacuum within head space 65 that falls below the vapor pressure of MRF 100. Such a vacuum is undesirable because it could lead to formation of a vapor gap within the head space that would prevent the desired resistive forces from building up.

If it is unnecessary for the damper to be operative on the backstroke, the need for pressurization can be eliminated by installing a check valve in socket 40 between the head space and the surrounding MRF. Such a check valve would permit MRF to flow freely through the socket during the backstroke, thereby preventing the formation of a partial vacuum.

Figure 2:
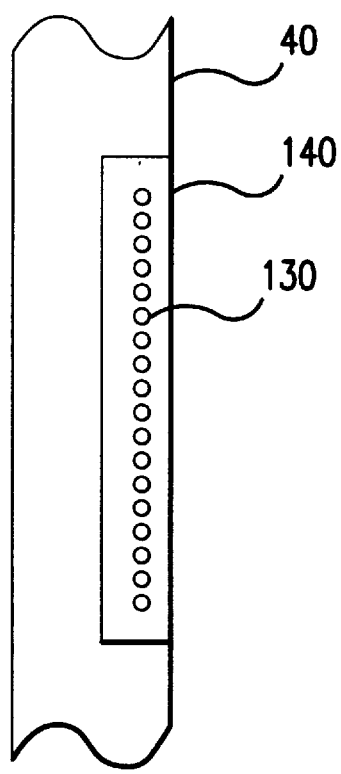
FIG. 2 is a detail of the damper of FIG. 1, showing a field coil embedded in an insert.

Inner field coil 120 and outer field coil 130 produce the applied magnetic field that controls the Theological properties of the MRF. The outer field coil is set in the radially inward-facing surface of the socket, and the inner field coil is set in the radially outward-facing surface of the plug. As shown in FIG. 2, one convenient way to provide a coil for assembly is to cast or pot it in a hardenable material to provide an insert 140 for subsequent assembly with the socket or plug. A source of energizing current for inner field coil 120 is conveniently made accessible through region 70. A source of energizing current for outer coil 130 (which may be the same source used for the inner field coil) is conveniently made accessible through a cavity in the piston or through the wall of the socket or outer case.

To maintain alignment, and a constant gap width, between the socket and the plug, it is desirable to provide sliding spacers (not shown in the figure). Useful such spacers are conveniently made, for example, from blocks of polytetrafluoroethylene. Various schemes for the use of such spacers will be readily apparent to those skilled in the art, and need not be described here in detail.

The inner and outer field coils are exemplarily of equal lengths, and contain equal numbers of turns. Such a pair of coils are preferably energized with the same magnitude of electric current. The current flows in opposite senses through the respective coils. As a consequence (provided the coils are lined up so as to face each other along their entire respective lengths), there will be substantial cancellation of the magnetic fields produced by the respective coils, everywhere but within gap 60.

By way of example, a typical coil will have several hundred turns and will be energized with several tens of amperes of current. In a damping device of the typical dimensions described here, such coils will typically produce magnetic field intensities, within gap 60, of 250 kA/m or more. This provides nearly the maximum switching effects in available MRFs.

In practice, displacements of the piston may in some cases bring the respective coils into sufficient misalignment to produce a significant magnetic field outside of gap 60. To prevent this, it will in some cases be advantageous to provide multiple coils on the socket, the plug, or both. The coils are arranged such that, at each piston position, some pair of opposing coils is in adequate alignment. At each such position, the best-aligned pair of coils is the pair that is selectively energized.

In an alternate arrangement, one of the two coils is made longer than the other, and sliding contacts are used to energize that portion of the longer coil that opposes the shorter coil. In another alternate arrangement, one of the opposing coils is divided into a plurality of relatively short coils. A switching system is used to selectively energize that contiguous subset of these short coils that best lines up with the opposing coil.

Figure 3:
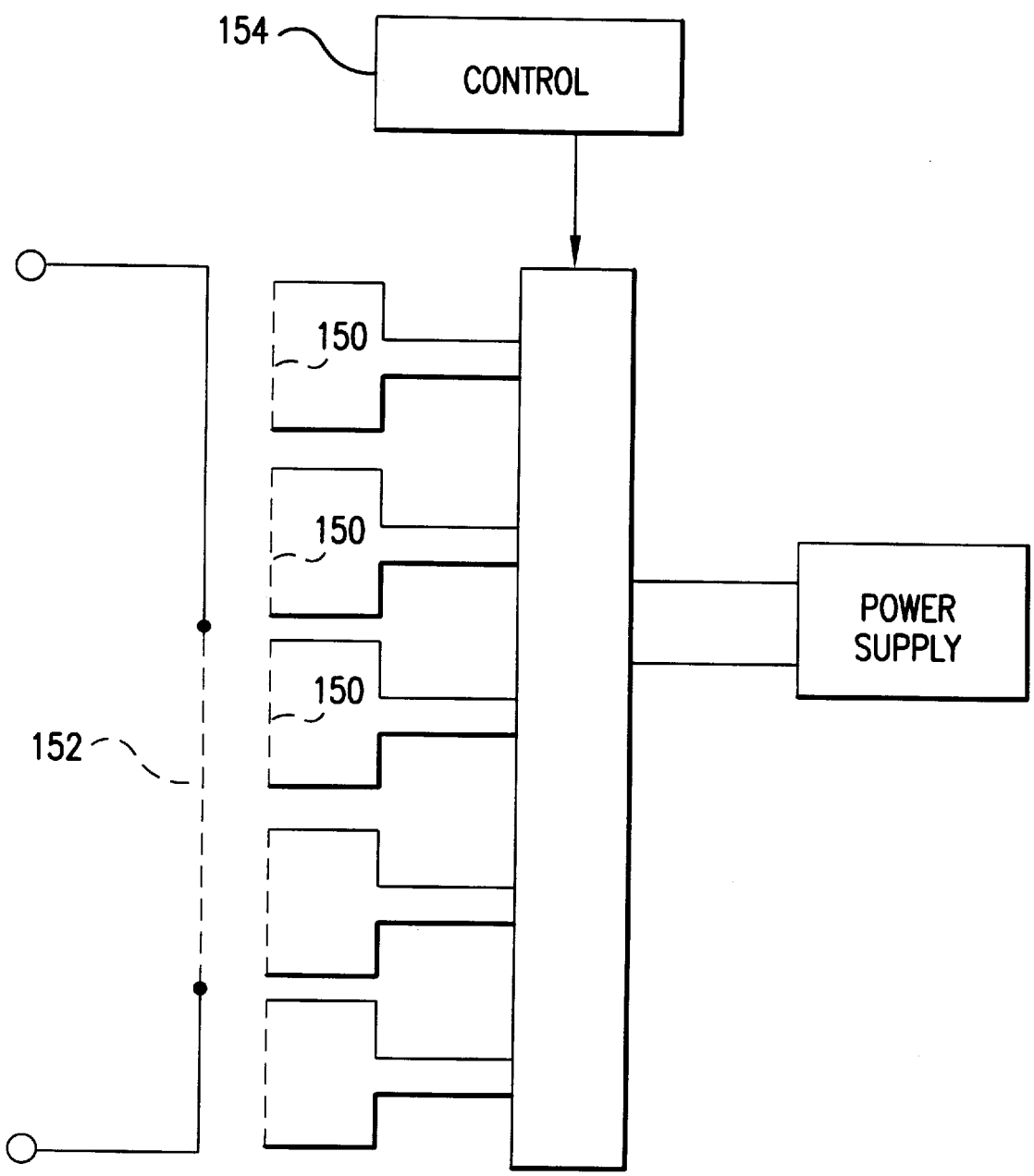
FIG. 3 is a schematic diagram of a field coil opposed by a switchable bank of coils, according to the invention in an alternate embodiment.

For example, FIG. 3 shows an illustrative bank of five short coils 150 opposed to longer coil 152. The coils 150 may also represent a permanent magnet or an array of permanent magnets. As directed via control 154, switching device selectively energizes the desired coil or coil combination.

Turning again to FIG. 1, we have developed a further useful feature of a rheological damping device, whether or not the viscous fluid is a MRF. This feature, which we refer to as a dead-band piston, is depicted as element 160 in the figure. further details of the dead-band piston are shown in FIG. 4, which should be read together with FIG. 1 in connection with the present discussion.

There has been a need for a damping device that produces only minimal resistive forces in response to relatively small displacements of the piston, and produces substantial resistance only when the piston displacements exceed a threshold. (Such resistance may be provided not only by a MRF, but also by a conventional viscous damping fluid that is urged through, e.g., a narrow constriction or channel.) For example, there are applications for a damping device that not only suppresses impulsive disturbances in a structure, but also provides acoustic isolation of the structure. However, it may be difficult or impossible, in practice, to achieve both of these goals. That is, damping that is sufficient to counteract impulsive loads is also generally sufficient, by broadening the resonant response curve, to render the damping device transmissive to a broad band of acoustic frequencies. Acoustic vibrations, however, are generally of relatively small amplitude. Therefore, a damping device that decouples small-amplitude oscillatory loads will have reduced acoustic transmissivity. The dead-band piston performs such decoupling.

Figure 4:
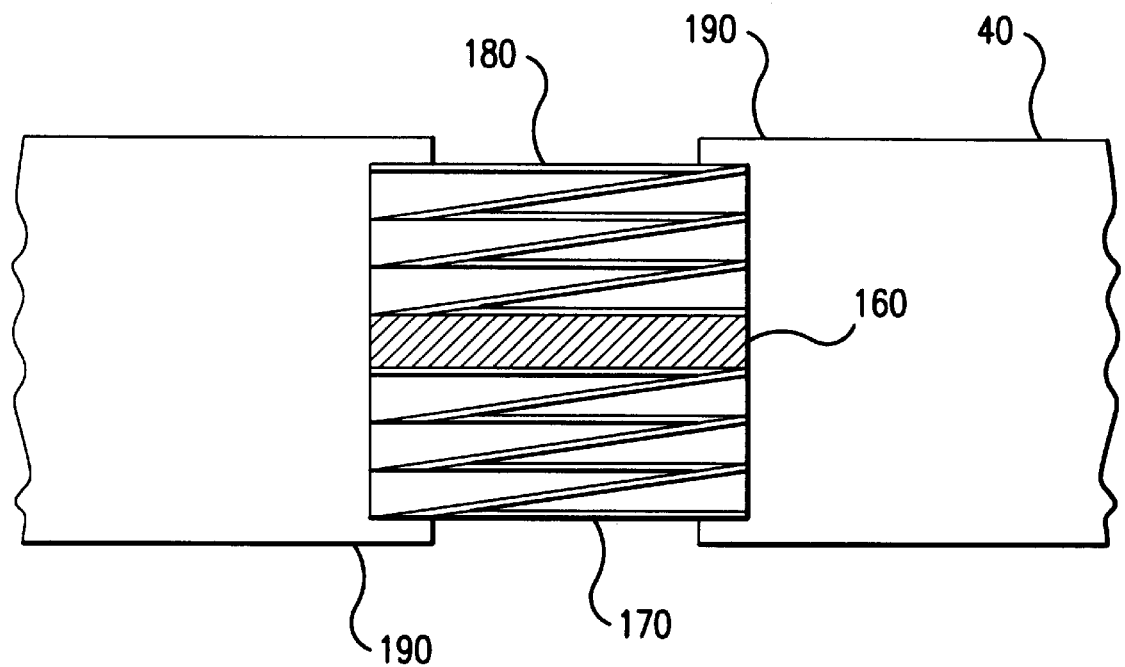
FIG. 4 is a detail of the damper of FIG. 1, showing an illustrative deadband piston.

As shown most clearly in FIG. 4, dead-band piston 160 is a disk that rides up and down (in the view represented in the figures) within bore 170, which passes entirely through the upper (in the view represented in the figures) end of socket 40. Support for piston 160 will typically be provided by a spring, such as helical spring 180. The range of motion of piston 160 may be limited, for example, by stops 190 defined in the ends of bore 170.

The stroke of piston 160 will accommodate some of the volume change within head space 65. That is, if there is substantial resistance to flow through gap 60, displacements of piston rod 20 within a narrow range will cause fluid to flow between head space 65 and bore 170, without substantially flowing through the gap. This narrow range may be calculated as the maximum stroke of piston 160, multiplied by the area of piston 160, and divided by the area of the head space. When piston rod 20 is displaced beyond this range, dead-band piston 160 will press against one of stops 190 and effectively seal bore 170. This will require the fluid to pass through gap 60. It should be noted that in practice, it will not generally be necessary for piston 160 to form a tight seal in order to be effective for this purpose.

The invention claimed is:

1. An apparatus comprising a chamber for containment of a magnetorheological fluid (MRF), a shaft having an end portion that extends within the chamber, and a coil arrangement for subjecting at least a portion of the MRF to magnetic fields when said coil arrangement is energized with electric current, thereby to alter viscous properties of said MRF, wherein:
    the coil arrangement comprises at least one inner coil and at least one outer coil coaxial with the inner coil;
    there is a radial gap between said inner and outer coils;
    at least part of said gap is open to entry thereinto of MRF; and
    said inner and outer coils are arranged such that when said fields are respectively energized by oppositely circulating electric currents, each at least partially cancels the magnetic field of the other in at least some regions exterior to said gap, but no substantial such cancellation takes place within said gap.

2. The apparatus of claim 1, wherein:
    the end portion of the shaft terminates in a shaft head;
    the apparatus further comprises at least one projection within the chamber,
    the shaft head is conformed to partially enclose the projection;
    the outer coil is integral with the shaft head; and
    the inner coil is integral with the projection.

3. The apparatus of claim 2, wherein:
    the shaft has a longitudinal axis;
    the shaft, the shaft head, and the projection are coaxial with respect to said axis; and
    the gap extends radially with respect to said axis.

4. The apparatus of claim 3, wherein the shaft head is formed as a hollow, capped cylinder such that in use, a portion of the MRF lies within said cylinder, and said portions intercommunicate via the gap.

5. The apparatus of claim 4, wherein the coil integral with the shaft head is one of at least two such coils, and the apparatus further comprises a switch for selecting, from alternative coils integral with the shaft head, a subset of such coils to be energized with electric current.

6. The apparatus of claim 4, wherein the coil integral with the projection is one of at least two such coils, and the apparatus further comprises a switch for selecting, from alternative coils integral with the projection, a subset of such coils to be energized with electric current.

7. The apparatus of claim 2, herein the coil integral with the shaft head is one of at least two such coils, and the apparatus further comprises a switch for selecting, from alternative coils integral with the shaft head, a subset of such coils to be energized with electric current.

8. Apparatus of claim 2, wherein the coil integral with the projection is one of at least two such coils, and the apparatus further comprises a switch for selecting, from alternative coils integral with the projection, a subset of such coils to be energized with electric current.

9. The apparatus of claim 2, wherein the shaft head is formed as a hollow, capped cylinder such that in use, a portion of the MRF lies within said cylinder, a portion of the MRF lies without said cylinder, and said portions intercommunicate via the gap.

10. The apparatus of claim 1, wherein:
    the shaft comprises a piston rod adapted to undergo longitudinal displacements.

11. The apparatus of claim 1, wherein:
    the shaft has a longitudinal axis and is adapted to undergo torsional displacements about said axis.

12. The apparatus of claim 1, wherein:
    the shaft comprises a piston rod adapted to undergo longitudinal displacements;
    the shaft has an end portion that terminates in, a piston head;
    the piston head is conformed such that at least some longitudinal motions of the shaft tend to impel MRF through the gap;
    a borehole extends entirely through the piston head in the direction of said longitudinal motions such that for relatively smaller longitudinal motions of the shaft, some MRF can flow preferentially into the borehole, whereby flow of MRF through the gap is at least partially suppressed;
    a floating piston having a stroke range is disposed within said borehole; and
    at least at one end of the stroke range, the floating piston meets a stop such that the borehole is at least partially sealed against flow of MRF, whereby for at least some relatively larger longitudinal motions of the shaft, flow of MRF through the gap is restored.

13. An apparatus comprising a chamber for containment of a magnetorheological fluid (MRF), a shaft having an end portion that extends within the chamber, said end portion terminating in a shaft head, a magnet arrangement for subjecting at least a portion of the MRF to a magnetic field, thereby to alter viscous properties of said MRP and a pressurized air laver formed over the MRF, wherein:
    the apparatus further comprises at least one projection within the chamber;
    the shaft head is conformed to partially enclose the projection such that a gap is defined between the shaft head and the projection;
    the shaft, the shaft head, and the projection have a common axis, and the gap is formed by a radial separation, relative to the axis, between the projection and the shaft head; and
    the magnet arrangement is adapted to subject the MRF within at least a portion of the gap to a magnetic field.

14. An apparatus comprising a chamber for containment of a liquid, and a shaft having an end portion that extends within the chamber, said end portion terminating in a shaft head and a pressurized air layer formed over the liquid, wherein:

the apparatus f urther comprises at least one projection within the chamber;

the shaft head is conformed to partially enclose the projection such that a gap is defined between the shaft head and the projection, and at least some longitudinal displacements of the shaft tend to impel liquid through the gap; and the gap is conformed to present a relatively resistive pathway for flow of the liquid, such that at least some of said displacements are damped.

15. The apparatus of claim 14, wherein:

the liquid is a magnetorheological fluid (MRF);

the apparatus further comprises a magnet arrangement for subjecting at least a portion of the MRF within said gap to a magnetic field, thereby to alter viscous properties of said MRF; and the magnet arrangement is adapted to subject MRF within at least a portion of the gap to the magnetic field.

16. The apparatus of claim 15, wherein the magnet arrangement comprises at least one permanent magnet.

17. The apparatus of claim 15, wherein the magnet arrangement comprises at least one electrically conductive coil.

18. The apparatus of claim 14, wherein:

the shaft has a longitudinal axis;

the shaft, the shaft head, and the projection are coaxial with respect to said axis; and the gap extends radially with respect to said axis.

19. The apparatus of claim 18, wherein the shaft head is conformed as a hollow, capped cylinder such that in use, a portion of the liquid lies within said cylinder, a portion of the liquid lies without said cylinder, and said inside and outside portions intercommunicate via the gap.

20. A apparatus comprising a chamber for containment of a liquid and, within said chamber, an end portion of a main piston, said end porti on terminating in a piston head that is arranged such that at least some longitudinal motions of the main piston tend to impel liquid through one or more relatively flow-resistive pathways, wherein:

a borehole extends entirely through the piston head in the direction of said longitudinal motions such that for relatively smaller longitudinal motions of the main piston, some liquid can flow preferentially into the borehole, whereby liquid flow through .said platively flow-resistive pathways is at least partially suppressed;

a floating piston having a stroke range is disposed within said borehole; and at least at one end of the stroke range, the floating piston meets a stop such that the borehole is at least partially sealed against liquid flow, whereby for at least some relatively larger longitudinal motions of the main piston, liquid flow through said relatively flow-resistive pathways is restored.

21. The apparatus of claim 20, wherein:

the device further comprises at least one projection within the chamber;

the piston head is conformed to partially enclose the projection such that a gap is defined between the piston head and the projection; and the gap provides at least one said relatively flow-resistive pathway.

22. The apparatus of claim 21, wherein:

the main piston has a longitudinal axis;

the main piston, the piston head, and the projection are coaxial with respect to said axis; and the gap extends radially with respect to said axis.

23. The apparatus of claim 22, wherein the piston head is conformed as a hollow, capped cylinder such that in use, a portion of the liquid lies within said cylinder, a portion of the liquid lies without said cylinder, and said inside and outside portions intercommunicate via the gap.

24. The apparatus of claim 20, wherein the floating piston is supported within the borehole by at least one spring.

\* \* \* \* \*